Figure 6:
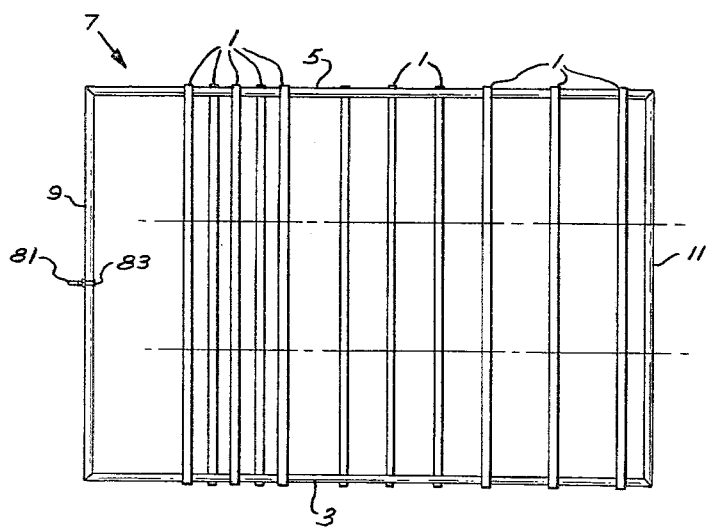

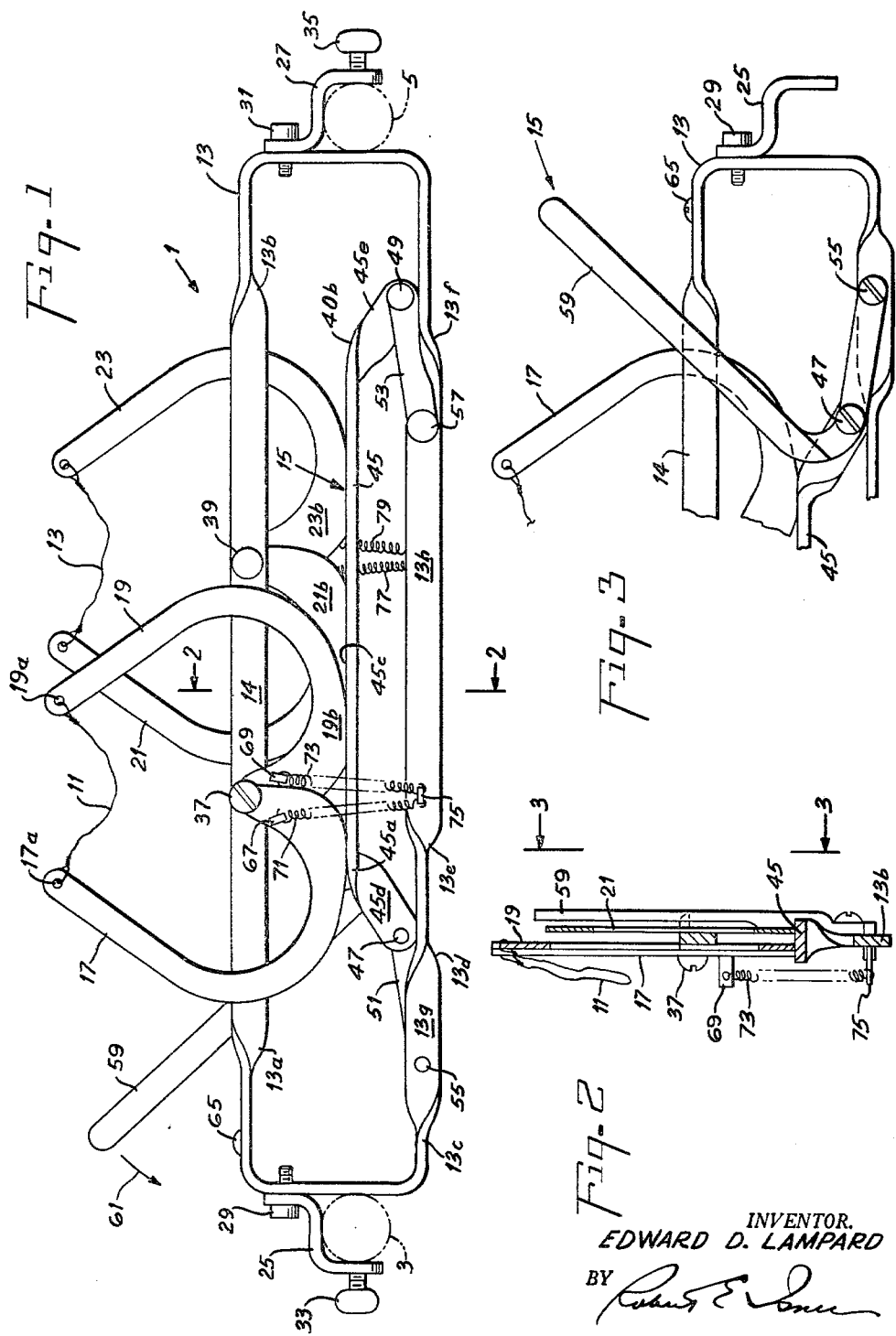

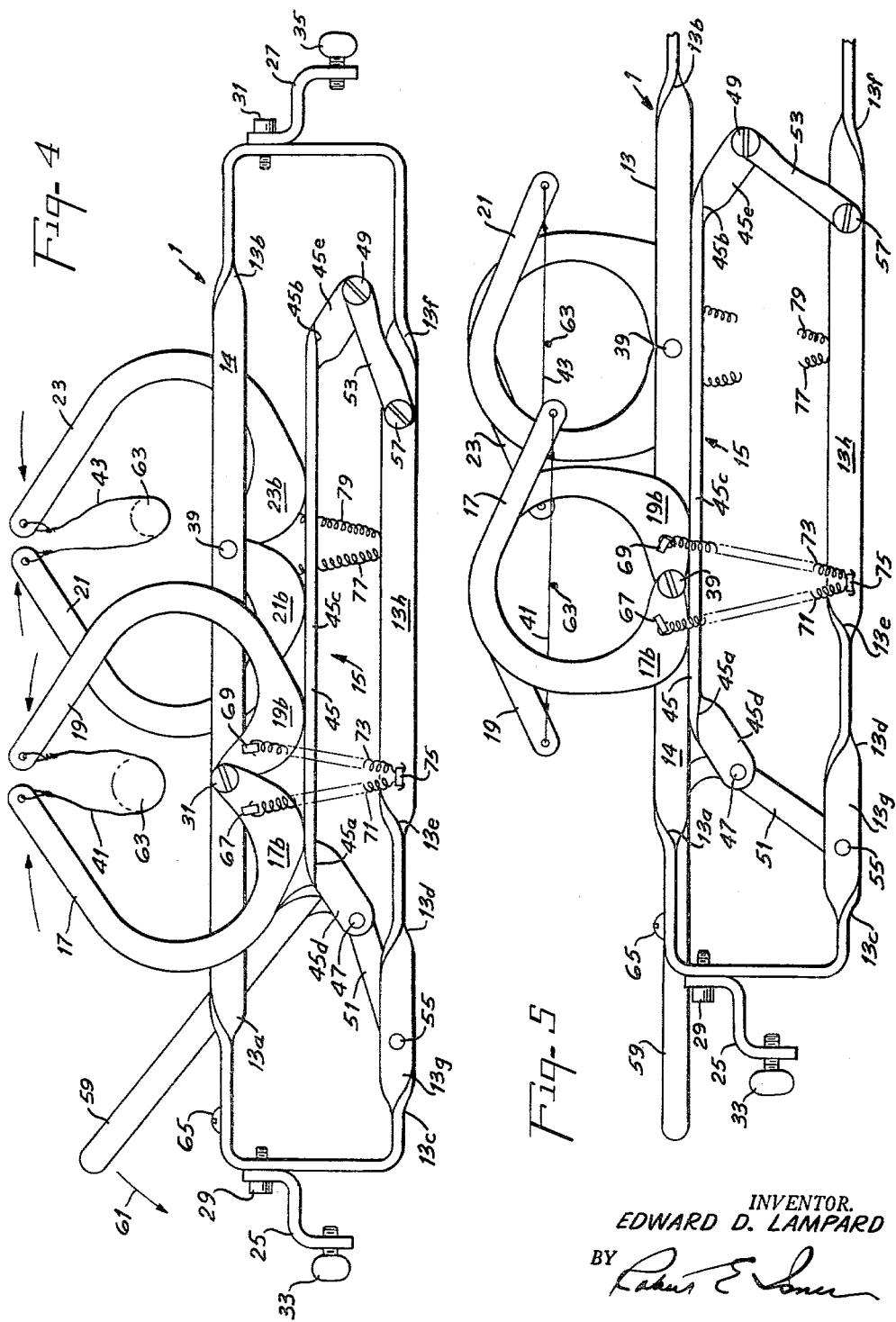

Jan. 11, 1966 E. D. LAMPARD 3,228,059
SAUSAGE FORMING AND RETAINING RACK
Filed Jan. 7, 1964 3 Sheets-Sheet 3

INVENTOR.
EDWARD D. LAMPARD
BY
ATTORNEY

United States Patent Office 3,228,059
Patented Jan. 11, 1966

3,228,059
SAUSAGE FORMING AND RETAINING RACK
Edward D. Lampard, 50 Glen Byron Ave.,
South Nyack, N.Y.
Filed Jan. 7, 1964, Ser. No. 336,267
5 Claims. (Cl. 17—34)

This invention relates to the forming and curing of sausages and the like and particularly to an improved rack apparatus for forming and positionally retaining lengths of sausage and the like to facilitate formation, transport and curing thereof.

One object of this invention is the provision of an improved device of the general character described for forming a length of undeformed encased sausage into defined sausage links by introduction of spaced areas of reduced cross-sections therealong and to positionally retain the material so formed during smoking or other finishing operations.

Another object of the present invention is the provision of a device of the character described which will effect sausage like formation without introduction of link-defining knots as is conventionally employed, thereby not only avoiding knot formation, but, also its subsequent removal.

A further object of this invention of an improved rack assembly that is readily adaptable to the fabrication of sausage links of any predetermined length and to the positional retention of maximum numbers thereof on each rack.

A still further object of this invention is the provision of a device of the character described which is light in weight, efficiently utilizable and readily transportable and yet which is also of a sturdy and durable construction that is well adapted to withstand the rough usage to which devices of this type frequently are subjected.

It is also a still further object of the invention to provide an improved device that is simple, inexpensive and adapted to high speed sausage production.

The subject invention may be briefly described as apparatus incorporating the selectively positionable supporting of short lengths of displaceable flexible material to transversely receive an elongate and undeformed length of sausage, the encircling displacement by said short lengths of flexible material circumferentially about the length of sausage to effect selectively spaced deformation thereof and the maintenance of said short lengths of material in encircling relation during the smoking or other curing operations. In its more specific aspects, the subject invention includes the mounting of said short lengths of material on subframe elements each selectively positionable on a main frame and wherein each subframe is individually operable in response to a single actuator.

Figure 7:
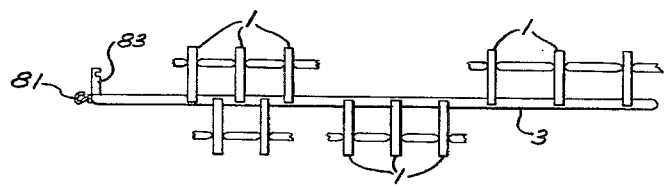

Other objects and advantages will be apparent to those skilled in the art from the following description and from the accompanying drawings which disclose the principles of the invention as embodied in a presently preferred embodiment thereof and in which:

FIGURE 1 is a side elevational view of a subframe assembly showing the sausage deforming mechanism in open position, FIGURE 2 is a sectional view as taken on line 2—2 of FIGURE 1, FIGURE 3 is a partial view of the actuator bearing end of the subframe mechanism as taken on the line 3—3 of FIGURE 2, FIGURE 4 is a view similar to that of FIGURE 1 but showing the sausage deforming mechanism in partially closed position, FIGURE 5 is a view similar to that of FIGURES 1 and 4 but showing the sausage deforming mechanism in closed and holding position, FIGURE 6 is a schematic plan view of the main frame showing selectably varied spacing of the subframe assemblies thereon for accommodation of different lengths of sausage, and FIGURE 7 is a schematic side elevational view of the assemblage illustrated in FIGURE 6 and exemplary showing sausage fixed on the device.

Referring to FIGURE 1, there is illustrated a subframe assembly, generally designated 1, detachably and slidably adjustable on the side members 3 and 5 of a rectangularly shaped main frame 7 as shown in FIGURE 6. As illustrated in FIGURES 6 and 7, several subframe assemblies are mounted on the main frame and positioned in selectively spaced relation as required for the particular length of sausage product to be formed. The illustrated spacing of the subframe assemblies on FIGURE 7 is intended to demonstrate, by way of example, the wide range of selective adjustability of sausage length.

Returning again to FIGURE 1, the subframe assembly 1, as generally designated broadly includes a rectangular perimetric frame 13 having mounted thereon an actuator mechanism generally designated 15, two pairs of arcuate lever-like members 17 and 19 and 21 and 23 and terminally disposed clamp members 25 and 27 by which the illustrated subframe assembly is attached to the side members 3 and 5 of the main frame 7. As illustrated, the clamp members may be conveniently secured to the subframe 13 by screws 29 and 31 threaded into the frame 13 or by welding thereto and set screws 33 and 35 are provided to adjustably secure the frame 13 to the main frame members 3 and 5.

As illustrated, the frame 13 may be conveniently formed of steel band stock of rectangular cross section and is selectively twisted at right angles at selective locations, as for example at 13a and 13b, to present a broad vertical platform 14 to accept pivot or hinge screws 37 and 39, by which the pairs of arcuate lever-like members 17 and 19 and 21 and 23 are respectively mounted on the frame 13. As best shown in FIGURE 2, the lever members 17 and 19 are preferably formed from flat stock and mounted, in adjacent abutting relation on the screw 37 on one side of the platform 14 and, as so arranged, to pass on opposite sides of a plane defined by the adjacent abutting flat surfaces of the levers. Lever members 21 and 23 are similarly mounted on the opposite side of the platform 14 on screw 39. Connected between the free ends of lever members 17 and 19 is an elongated flexible member 11 which may conveniently consist of a cord of suitable strength threaded through holes 17a and 19a and terminally secured thereto. A cord 13 is connected between the free ends of lever members 21 and 23 in the same manner.

The illustrated actuator mechanism 15 is formed of a central link 45 twisted at 45a and 45b to provide a horizontal central segment 45c and downwardly inclined vertical segments 45d and 45e at each end pivotally connected, as by pivot pins 47 and 49, to link members 51 and 53. As illustrated, link member 53 has its other end pivotally secured to the frame 13 by pivot pin 57, while link 51 is pivotally secured to the frame 13 by pivot pin 55 and is provided with an extended handle 59. In order to facilitate the above, the lower portion of the frame 13 is selectively formed with twists 13c and 13d defining a short vertical platform segment 13g, and with twists 13e, and 13f defining a long vertical platform segment 13h.

As previously described, link 51 is provided with an extension 59 to form an accessible handle by which the actuator mechanism 15 can be displaced. As shown in FIGURES 1, 4 and 5, a downward movement of the handle 59 as indicated by the arrows 61, results in an upward displacement of the central link 45 with maintenance of its central segment 45c in a horizontal plane. As also shown in FIGURES 1, 4 and 5, the intermediate portions of the lever-like members 17, 19, 21 and 23 disposed in an abutting relation with said surface 45c are selectively shaped to present cam surfaces, generally designated 17b, 19b, 21b and 23b respectively, by which the pairs of levers are rotatably displaced, each lever moving toward its associated lever. As shown in FIGURES 1, 4 and 5, the free ends of the lever-like members are displaced toward and past each other until they ultimately reach the closed position in FIGURE 5.

In this closing operation, it will be noted that the opposite ends of cords 41 and 43 move toward each other in the substantially common plane of travel of the associated ends of lever-like members to initially encircle a portion of an undeformed sausage as indicated at 63, and then, through continued movement, to partially define a sausage link by reducing the cross section thereof, as indicated in FIGURE 5. In the closed position of the lever-like members, as shown in FIGURE 5, the actuator handle 59 is in its lowered position, as shown, and is maintainable in this position by suitable latch means, which may conveniently consist of a screw 65 threaded into the subframe 13 in such manner that a portion of the screw head extends outwardly from the edge of the frame to form a shoulder engageable by the handle to prevent upward movement thereof.

To release the lever-like members for return to open position, the handle 59 may readily be moved slightly sideways away from the frame 13 to clear the overhanging shoulder portion of the stop screw 65 and the handle 61 is displaceable upwardly to its original position shown in FIGURE 1. By such action, the central link 45 of the actuator 15 is displaced downwardly to the position shown in FIGURE 1, with the downwardly extending ends of the link 45 adjacent the pivots 47 and 49 engaging the frame 13 as shown in FIGURE 1 to limit such downward displacement.

The cam surfaces of the lever-like members 17, 19, 21 and 23 are maintained in operative contact with the central segment 45c of the link 45 during displacement of the latter by individual biasing springs 71, 73, 77, and 79, each interconnected between extending apertured lugs, as for example, lugs 67, 69, mounted on the lever-like members and a common apertured lug 75 secured to the segment 13h of the frame 13. A similar construction is provided for terminal securement of springs 77 and 79.

Referring again to FIGURE 6 there is shown, by way of example, eleven subframe assemblies 1 connected, at various illustrated spacings, to the side frame members 3 and 5 of the main frame 7 and also on opposite sides thereof as indicated diagrammatically in FIGURE 7. As previously mentioned, the selective spacing of the subframe assemblies 1 along the frame 7 will depend upon the desired length of sausage to be formed. A hook 81 or other suitable means is provided to hang the frame 7 in a smokehouse as is a reversing standard 83 to provide for reversal of direction of a sausage casing.

In the formation of sausage links by the subject apparatus, the subframe assemblies 1 are initially selectively positioned in accordance with the desired lengths of sausage links to be formed and lengths of encased and undeformed sausage 63 are introduced intermediate the lever-like members and supported by the aligned cords 41, 43. With the undeformed sausage so positioned, the handles 59 are sequentially depressed, as indicated by the arrow 61 to cause the lever-like members to be displaced to closed position thereby selectively encircling and deforming the sausage at spaced intervals to form the desired links of sausage and to retain the links in place on the main frame 7. The main frame 7 and supported sausage links are then hung, as by the hook 81, in a smokehouse or other curing chamber. When the curing process is completed, the frame 7 is removed and the handles 59 are sequentially raised to release the now formed and processed sausage links, by disengagement of the cords 41, 43 therefrom.

As will now be apparent to those skilled in this art, that among the advantages possessed by the subject invention are the elimination of all tieing, untieing or cord cutting operations; ready adjustment to desired length of sausage; a permitted increase in speed of sausage link formation and efficient utilization of rack capacity whereby links may be formed and held on both sides of a rack for economical use of curing space and reduction of transport operations.

While a preferred embodiment of the invention has been illustrated and described, it is to be understood that various changes can be made without departing from the true spirit and scope of the invention and it is intended that all matter contained in this description and in the accompanying drawings shall be interpreted as illustrative and not in a limiting sense.

Having fully disclosed my invention, what I claim as new and desire to secure by Letters Patent is:

1. A rack for forming and supporting sausages and the like comprising a plurality of narrow elongate flexible members, means terminally supporting said elongate members along axes normal to the longitudinal axes of said members to permit reception of a length of encased and undeformed sausage by said flexible members with said sausage being positioned parallel to said first mentioned axes and means providing relative movement of the terminally supported ends of each of said flexible members to cause said flexible members to encircle and deform the length of sausage at spaced intervals therealong to a reduced cross sectional area and to hold said length of sausage so deformed and positioned.

2. In a machine for forming and supporting sausages and the like the improvement comprising, a pair of arcuate members, means movably supporting said members for relative movement of associated portions of said members from an open spaced position toward and past each other in a substantially common plane to a closed position, flexible means connected between said associated portions of said members to supportingly receive a length of encased and undeformed sausage in the open position of said members, actuator means connected to said members for effecting displacement of said members between said open and closed positions and for releasably locking said members in closed position to deform the portion of the sausage supported on said flexible means to a reduced cross section.

3. A rack for forming and supporting sausages and the like comprising a main support frame, a plurality of narrow elongated flexible members, means connected to the ends of said members and connectable to said main frame for supporting said flexible members in selectively spaced parallel positions to supportingly receive, across said flexible members, a length of encased sausage, said means including actuated members connected to the ends of said flexible members and relatively displaceable to provide relative movement of the ends of each of said flexible members to encircle and deform the said length of sausage at spaced intervals therealong to a reduced cross sectional area said means also including means for displacing the actuated members to form said reduced cross sectional areas and means for returning the ends of said flexible members to their original position to release the formed length of sausage supported thereby.

4. A rack for forming and supporting sausages and the like for smoking comprising a main frame member having rods arranged in spaced parallel position, and a plurality of forming and supporting assemblies selectively securable to said rods in desired spacial relation, each of said assemblies including at least one pair of associated levers and a subframe member, said levers being pivoted to said subframe for movement along opposite sides of a common plane therebetween such that the free ends of said levers will move from an open spaced position toward and past each other in a substantially common plane to a closed overlapping position of said levers, flexible means connected between said free ends of said levers to supportingly receive a cased and undeformed sausage in the open position of said levers, and actuator means engageable with said levers and connected to said subframe for actuating said levers between said open and closed positions and for releasably locking said members in closed position to compressively deform the portion of the sausage supported on said flexible means to a reduced cross section and to hold said sausage in said position.

5. A rack as set forth in claim 4 and in which said levers and said actuator are formed with cooperative cam surfaces for opening and closing said levers.

No references cited.

SAMUEL KOREN, *Primary Examiner.*

LUCIE H. LAUDENSLAGER, *Examiner.*